United States Patent [19]

Jono et al.

[11] Patent Number: 5,078,477
[45] Date of Patent: Jan. 7, 1992

[54] FERROELECTRIC LIQUID CRYSTAL CELL

[75] Inventors: Masahiro Jono, Tokyo; Yukio Ouchi, Yokohama; Tomoyuki Yui, Nagareyama, all of Japan

[73] Assignee: Mitsubishi Gas Chemical Company, Inc., Tokyo, Japan

[21] Appl. No.: 433,261

[22] Filed: Nov. 8, 1989

[30] Foreign Application Priority Data

Nov. 9, 1988 [JP] Japan .................. 63-281175

[51] Int. Cl.$^5$ .................................................. G02F 1/13
[52] U.S. Cl. ........................................ 359/91; 359/103
[58] Field of Search ............. 350/346, 350 S, 347 V, 350/347 E, 350 F

[56] References Cited

U.S. PATENT DOCUMENTS 4,867,539  9/1989  Goodby et al. ................ 350/346

*Primary Examiner*—Andrew J. James
*Assistant Examiner*—Sara W. Crane
*Attorney, Agent, or Firm*—Wenderoth, Lind & Ponack

[57] ABSTRACT

A ferroelectric liquid crystal cell comprising a ferroelectric liquid crystal having an antiferro-electric phase ($S_mC_A^*$) or its composition and a pair of substrates having electrodes and holding said liquid crystal or its composition therebetween, characterized in that the layer structure of said liquid crystal in the antiferro-electric phase ($S_mC_A^*$) has once been changed from a chevron structure to a bookshelf structure by application of a voltage to the electrodes.

1 Claim, 7 Drawing Sheets

UNIFORM  HELICAL  UNWOUND  UNIFORM
3RD

FERROELECTRIC LIQUID CRYSTAL CELL

FIELD OF THE INVENTION

This invention relates to a novel ferroelectric liquid crystal cell having improved display characteristics which is useful in liquid crystal display devices or liquid crystal light shutters.

DESCRIPTION OF THE PRIOR ART

Much attention has been directed in recent years to surface stabilized ferroelectric liquid crystal (SSFLC for short) cells as electro-optical cells using ferroelectric liquid crystals. The SSFLC cells are characterized by having faster responses than conventional electro-optical cells using nematic liquid crystals and possessing bistability. This cell was developed by Clark et al. (see U.S. Pat. No. 4,367,924), and is said to be most likely to gain commercial acceptance. The switching theory of a director, which is a unit vector in the direction of molecular longitudinal axis, in the SSFLC cell is that when a ferroelectric liquid crystal is held in a cell (cell gap about 0.5 to 2 micrometers) having such a small thickness that the helical structure of the liquid crystal disappears, a bistable state of liquid crystal molecules appears. In two stable states, the liquid crystal molecules are in two uniform states in which the directors are aligned in the different directions.

The ferroelectric liquid crystals can lead to high-speed response characteristics and memory characteristics because they have spontaneous polarization and can have bistability. Hence, they are expected to be applicable to high-density large-screen displays and high-speed light shutters. The SSFLC cell utilizing this bistable state has recently showed a great advance with the development of liquid crystal materials. However, to utilize the SSFLC cell for displaying on a high-density large-screen display, for example, it is necessary to improve display characteristics of the cell. For example, it should have a higher contrast, a higher-speed response, and a clearer voltage threshold value, and can achieve bistability even when the cell thickness ia larger.

Recent studies have shown that for improvements in contrast and response, the layer structure of a liquid crystal should be controlled. The layer structure of the ferroelectric liquid crystal differs depending upon the method of an aligning treatment. Generally, however, the ferroelectric liquid crystal is of a chevron structure in which the layers are bent in the shape of "<" with respect to two parallel-laid glass substrates. In many cases, by the misarrangement of the directions of the bent layers, zig-zag defects occur, and as a result of light leakage through these defects, the contrast of the cell decreases greatly. It has also been known that the response speed is higher when the layer is of the bookshelf structure than when it is of the chevron structure. Accordingly, the bookshelf structure in which the layers are generally perpendicular to the glass substrate is desired as the larger structure of a ferroelectric liquid crystal cell free from zig-zag defects.

It is known that since generally the layer structure of conventional ferroelectric liquid crystal is not changed by an electric field, zig-zag defects do not disappear. However, there are a few examples in which zig-zag defects can be removed by an electric field, although the layer structure is not studied in detail. In these cases, it is necessary to optimize the surface treatment of substrates, cell thickness and an applied voltage in order to remove zig-zag defects.

SiO oblique evaporation is generally known as a method of obtaining a liquid crystal cell with the liquid crystal layer having a bookshelf structure (Japanese Journal of Applied Physics, vol. 27, p. L725, 1988 and Japanese Journal of Applied Physics, vol. 27, p. L1993, 1988), but this method is difficult to practice industrially for large scale displays.

Since the disclosure of the SSFLC cell by Clark et al, many ferroelectric liquid crystal compounds have been synthesized. In recent years, ferro-electric liquid crystalline compounds having an antiferroelectric phase (antiferroelectric liquid crystals) have attracted attention (Japanese Laid-Open Patent Publication No. 213390/1989, and Japanese Journal of Applied Physics, vol. 27,p. L729, 1988). The characteristics of antiferroelectric liquid crystals, such as their threshold voltage characteristics, the hysteresis characteristics of the apparent tilt angle (the angle formed between the normal of the liquid crystal layer and the average direction of molecular longitudinal axis)and the tristable state (two uniform states and the third state), have been known. But no information has yet been obtained on the layer structure of an antiferroelectric liquid crystal.

The present inventors measured the relation between the tilt angle and the applied voltage in a ferroelectric liquid crystal, determined the threshold dc voltage with respect to director switching in liquid crystal molecules, and analyzed the layer structure of a liquid crystal at an applied dc voltage slightly higher than the threshold voltage by using an X-ray diffraction device. They have consequently ascertained that the ferroelectric liquid crystals with an antiferroelectric phase are of the chevron structure, and by observation of their textures, many zig-zag defects are seen to exist. The ferroelectric liquid crystal cell having an antiferroelectric phase has the advantage that it has a very clear threshold value with respect to dc voltage and has memory characteristics even with a large cell thickness. In this regard, it may be said that the liquid crystal cell using a ferroelectrical liquid crystal having an antiferroelectric phase is much improved over liquid crystal cells using conventional ferroelectric liquid crystals. However, a layer structure of a ferroelectric liquid crystal having an antiferroelectric phase is of the chevron structure as are the conventional ferro-electric liquid crystals. To improve the contrast and response speed, it is desired to convert the layer structure of the liquid crystal to a bookshelf structure.

SUMMARY OF THE INVENTION

It is an object of this invention therefore to provide a ferroelectric liquid crystal cell having a high contrast and a high-speed response.

Another object of this invention is to obtain a ferroelectric liquid crystal cell in which the liquid crystal layer has little or no zig-zag defect.

Still another object of this invention is to obtain a ferroelectric liquid crystal cell suitable particularly for use in a high-density large-screen display and a high-speed light shutter.

The objects of the invention are achieved by a ferroelectric liquid crystal cell comprising a ferro-electric liquid crystal having an antiferro-electric phase ($S_mC_A{}^*$) or its composition and a pair of substrates having electrodes and holding said liquid crystal or its composition therebetween, characterized in that the layer structure of the liquid crystal or its composition in the antiferro-electric phase ($S_mC_A$) has once been changed from a chevron structure to a bookshelf structure by application of a voltage to the electrodes.

BRIEF DESCRIPTION OF THE DRAWINGS

α: the cell rotating angle
θ: the diffraction angle
Ki: incident X-rays
Ks: diffraction X rays

DETAILED DESCRIPTION OF THE INVENTION

The ferroelectric liquid crystal or its composition used in this invention must have an antiferroelectric phase ($S_mC_A^*$). It may be, for example, one which effects phase transition in a temperature lowering process from an isotropic phase to a chiral nematic phase (N*), a smectic A phase ($S_A$), a chiral smetic C phase ($S_c^*$) and to the antiferroelectric phase ($S_mC_A^*$), or one which effects phase transition from an isotropic phase, to a smectic A phase ($S_A$), a chiral smectic C phase ($S_c^*$) and finally to the antiferroelectric phase ($S_mC_A^*$). But these examples are not limitative.

Figure 4:
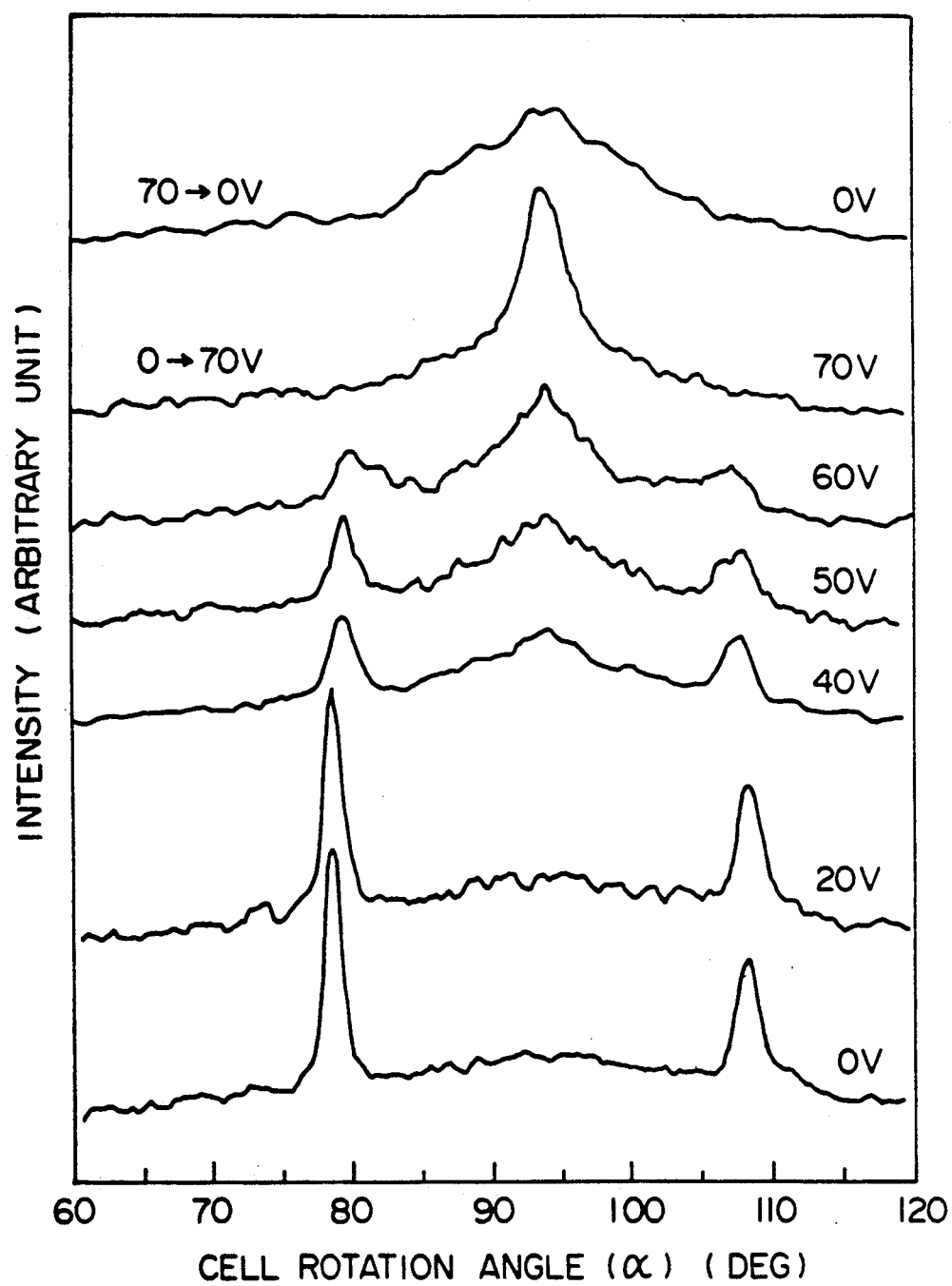
FIG. 4 shows X-ray diffraction patterns of the ferro-electric liquid crystal cell of the invention obtained at varying dc voltages applied.

The ferroelectric liquid crystal or its composition having the above phase transition is held between a pair of parallel-laid substrates having electrodes, and the liquid crystal or its composition is heated to render it isotropic in phase. Subsequent gradual cooling gives a ferroelectric liquid crystal or its composition in the state of an antiferroelectric phase ($S_mC_A^*$) In this state, the layer structure is of a chevron structure in the shape of "<" with respect to the substrates. By applying a voltage above a certain limit to the electrodes, the chevron structure changes to a bookshelf structure in which the liquid crystal layer is generally perpendicular to the substrates. When the application of the voltage is stopped, the bookshelf structure changes to a chevron structure in which the tilt angle to the normal to the substrates is small, or a layer structure which cannot be determined to be either the chevron structure or the bookshelf structure. The-X-ray diffraction patterns showing the above changes in layer structure are shown in FIG. 4.

The state of zig-zag defects in the layer structure was examined by observing the texture of the liquid crystal layer. Many zig-zag defects were observed before application of a voltage. But on application of a voltage, the layer structure changed to a bookshelf structure and the zig-zag defects disappeared. When the applied voltage was removed, the layer structure changed to a chevron structure in which the tilt angle to the normal to the substrates is small or a layer structure which cannot be determined readily to be a chevron or bookshelf structure. Surprisingly, no zig-zag defect was observed in this layer structure, either.

In the present invention, the expression "to once change the layer structure of the ferro-electric liquid crystal or its composition in the antiferro-electric phase from a chevron structure to a bookshelf structure" means the change to a bookshelf structure by applying an electric field in a cell which initially has a chevron structure and to which an electric field has never been applied after aligning the liquid crystal. There is no particular limitation in the wave form and the frequency of the voltage to be applied. But a direct current, a rectangular wave and a triangular wave, for example, may be used as the waveform. The preferred frequency is 0 to 1 KHz. The voltage to be applied depends upon the ferro-electric liquid crystal or its composition used. But in order to change the layer structure once from a chevron structure to a bookshelf structure, the voltage to be applied should be sufficiently higher than the threshold value for the director switching of liquid crystal molecules. For example, in the case of the ferro-electric liquid crystal used in Example 1 given hereinbelow, a voltage more than twice the threshold value for the director switching of the liquid crystal molecules was applied, and the layer structure completely changed to a bookshelf structure from the chevron structure.

In the prior art discussed above, there is no instance in which a liquid crystal cell having a bookshelf structure was obtained by the application of a voltage as in the present invention, nor an instance in which zig-zag defects are removed by changing the chevron structure to a bookshelf structure. For the first time in the art, the present invention has easily provided a liquid crystal cell with the bookshelf structure free from zig-zag defects.

When as described above, a voltage is applied to the liquid crystal cell to once change its chevron structure to a bookshelf structure, and then the application of the voltage is stopped, the bookshelf structure changes to a chevron structure having a small tilt angle to the substrates or a structure which is difficult to determine to be a chevron or bookshelf structure. The liquid crystal cell can actually be used in this state. In actual use, the voltage to be applied to the electrodes of the liquid crystal cell may be higher than the threshold value to the director switching of liquid crystal molecules. There is no need to make the applied voltage so high as the one applied to change the layer structure once to the bookshelf structure.

Figure 5A:
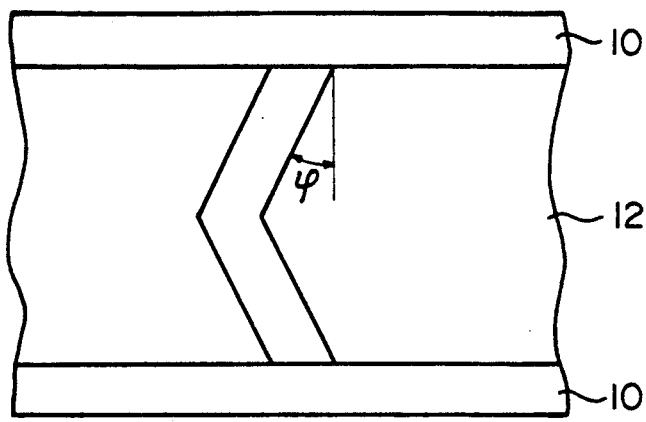
FIGS. 5A, 5B and 5C are sectional views of a liquid crystal cell schematically showing the layer structure of a smectic phase.
Figure 5B:
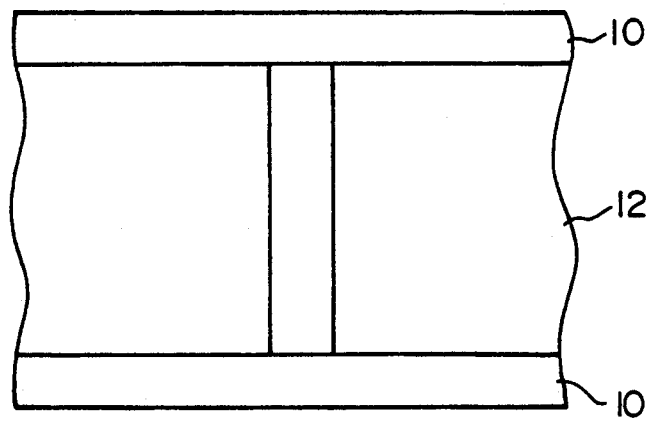
Figure 5C:
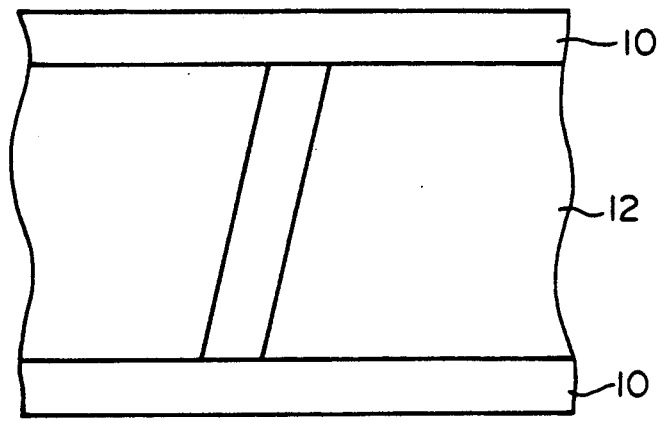

Roughly, the layer structure of the antiferro-electric phase ($S_mC_A^*$) is classified as either of a chevron or bookshelf. The chevron structure, as shown in FIG. 5A, denotes a state in which the layer of the liquid crystal is bent in the shape of "<" to the substrates. The bookshelf structure denotes the state in which the layer of the liquid crystal is perpendicular to the substrates as shown in FIG. 5B, or the layer is inclined to the substrates as shown in FIG. 5C. FIGS. 5A, 5B and 5C are sectional views of the liquid crystal cell, in which the number 10 represents a substrate and 12, a layer of a liquid crystal. In FIG. 5A, the layer of the liquid crystal is inclined at an angle $\psi$ with respect to the normal to the substrate 10.

Figure 1:
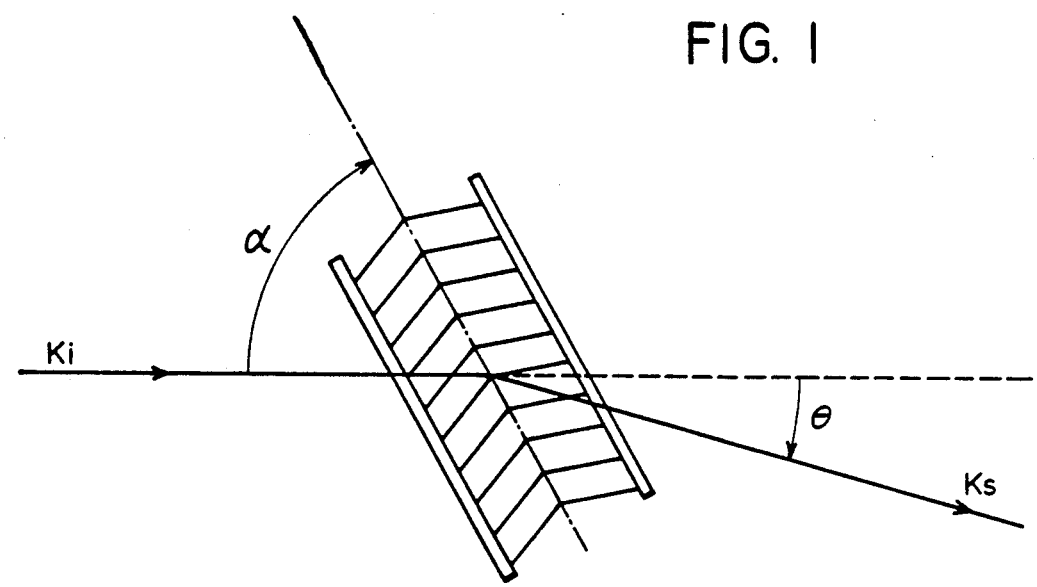
FIG. 1 is a view of an X-ray diffraction geometry used in analyzing the layer structure of a liquid in the ferroelectric liquid crystal cell of the invention. The symbols used have the following meanings.
Figure 2A:
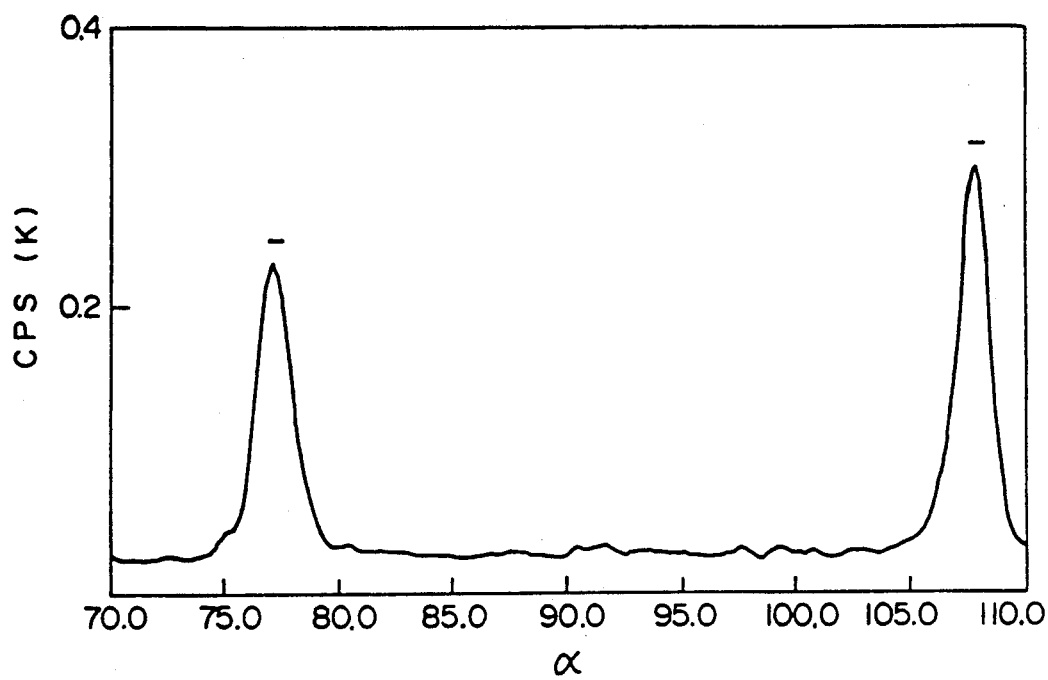
FIGS. 2A, 2B, 2C and 2D are X-ray diffraction patterns of the ferroelectric liquid crystal cell of this invention. The axis of abscissas shows the rotation angle and the axis of ordinates, the X-ray diffraction intensity (cps).
Figure 2B:
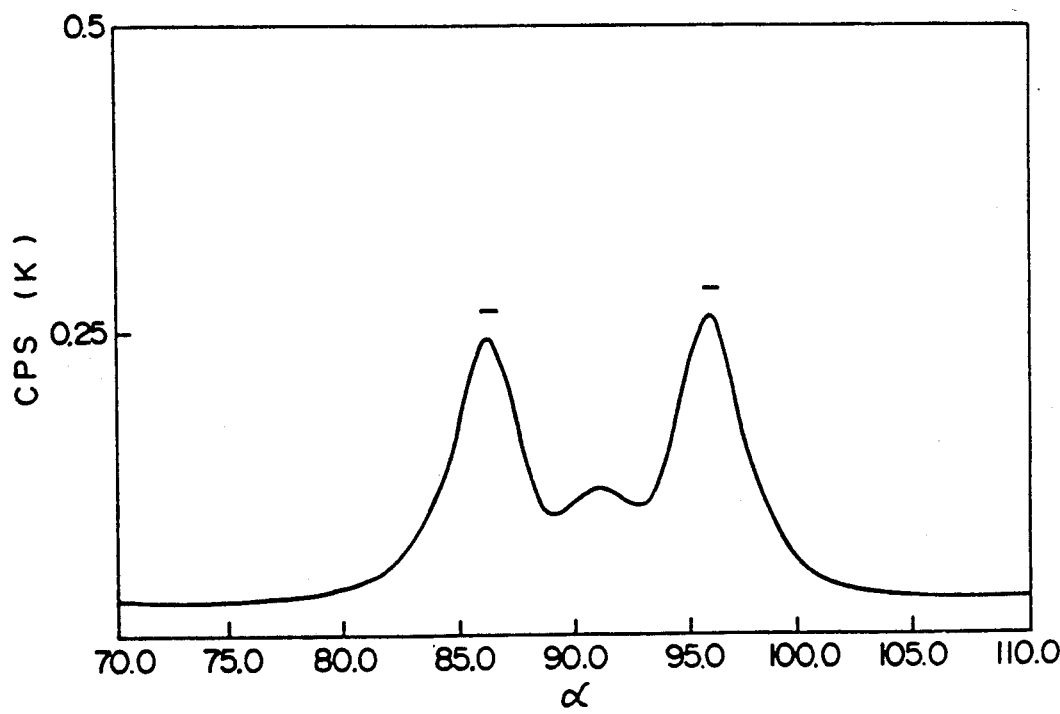
Figure 2C:
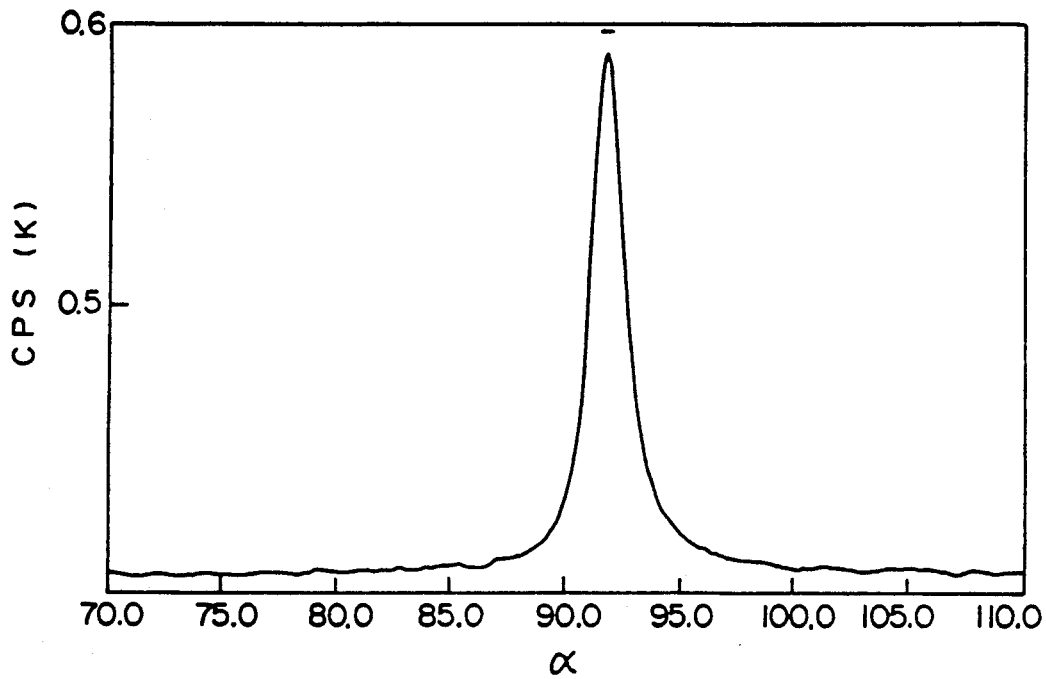

It has been found that the relation between the layer structure and the X-ray diffraction pattern obtained by using the X-ray diffractometric system shown in FIG. 1 is as follows. The X-ray diffraction pattern of the layer having a chevron structure usually has two peaks as shown in FIGS. 2A and 2B. The X-ray diffraction pattern of the layer having a bookshelf structure has a single sharp peak as shown in FIG. 2C. In the present invention, the chevron structure and the bookshelf structure are defined as follows:

(1) When the X-ray diffraction pattern of the layer clearly has two or more peaks as shown in FIGS. 2A and 2B, the layer structure is a chevron structure.

(2) When the X-ray diffraction pattern of the layer has only one sharp peak, the layer structure is a bookshelf structure.

(3) When the X-ray diffraction pattern of the layer has two or more peaks which cannot be clearly separated, whether the layer structure is of a chevron structure or a bookshelf structure is determined by the peak width at half height of the peak of the X-ray diffraction pattern. Specifically, a sufficiently high voltage (two or more times the threshold voltage) is applied to the liquid crystal cell until an X-ray diffraction pattern is obtained which has a single sharp peak as shown in FIG. 2C. In this voltage-applied state, the layer structure is a bookshelf structure. The peak width at half height ($P_B$) of the sharp peak of the resulting X-ray diffraction pattern is measured. Next, the peak width at half height ($P_S$) of the X-ray diffraction pattern of the layer to be determined is measured. If $P_S$ is less than two times $P_B$, the layer structure is determined to have a bookshelf structure. If $P_S$ is two or more times $P_B$, the layer structure is determined to be a chevron structure.

In the ferroelectric liquid crystal cell of the invention, switching between two uniform states can be performed at a high speed while retaining a liquid crystal layer of a bookshelf structure. It is assumed that the director switching between two uniform states in the ferroelectric liquid crystal cell of this invention proceeds by the same mechanism as in the case of switching between two uniform states in a chiral smectic C phase. The layer structure in the conventional chiral smectic C phase has a chevron structure and the mechanism of its director switching is known in detail. Japanese Journal of Applied Physics, Vol. 26, pp. 121-24, 1989 states that director switching between two uniform states proceeds at a higher speed when the layer structure is of a bookshelf structure than when it is of a chevron structure. However, there has been no practical method of easily making a liquid crystal cell in which the layer structure in the conventional chiral smectic C phase attains a bookshelf structure. In contrast, according to this invention, the layer structure of a liquid crystal can be easily changed from a chevron structure to a bookshelf structure by application of a voltage. Accordingly, a liquid crystal cell in which director switching between two uniform states can be performed at a high speed can be made easily.

Thus, according to the present invention described hereinabove, a ferroelectric liquid crystal cell having a high contrast and a high-speed response can be obtained by applying a voltage to the electrodes and thereby changing the layer structure of the liquid crystal layer from a chevron structure to a bookshelf structure. Thus, the ferroelectric liquid crystal cell of the invention shows excellent display characteristics.

The ferroelectric liquid crystals having unique properties used in this invention may be used singly or as a mixture (composition).

An example of the ferroelectric liquid crystals used effectively in this invention is a known compound, 4-(1-methylheptyloxycarbonyl)phenyl 4'-octyloxybiphenyl-4-carboxylate (compound A) having the following chemical structural formula.

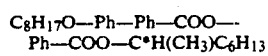

Ph: benzene ring
C*: asymmetric carbon

The above compound may be used as a mixture with one or more known compounds, examples of which are a group of compounds (compounds B) represented by the following general formulae.

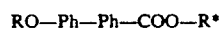

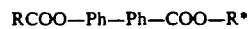

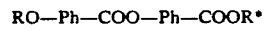

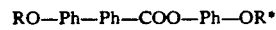

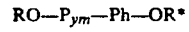

In the above formula:
R: an alkyl group
Ph: benzene ring
R*: a substituent containing asymmetric carbon
$P_{ym}$: pyrimidine ring Specific examples of the compounds (B) of the above formula are given below. It should be understood however that the invention not limited to these specific examples.

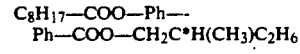

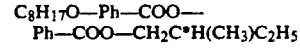

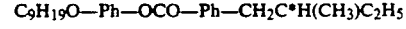

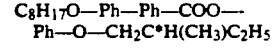

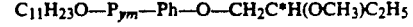

The composition composed of compound A and compound B may be prepared by mixing compound A with at least one compound B. Preferably, the compound A is mixed in an amount of 2 to 80 %, especially 3 to 70 % by weight, based on the resulting liquid crystal composition.

In the above-exemplified ferroelectric liquid crystalline compounds or mixtures, an antiferroelectric phase ($S_mC_A^*$) must be present when they are subjected to phase transition from an isotropic phase in the process of temperature falling. The antiferroelectric phase ($S_mC_A^*$) shows the following properties.

(1) The extinction position in the absence of an electric field of a liquid crystal cell aligned in parallel and having an antiferroelectric phase is in a direction normal to the layer and in a direction parallel to the layer when the liquid crystal cell is viewed from above (the direction normal to the layer and the direction parallel to the layer used in the following description denote those determined when the liquid crystal cell is viewed from above).

Figure 3:
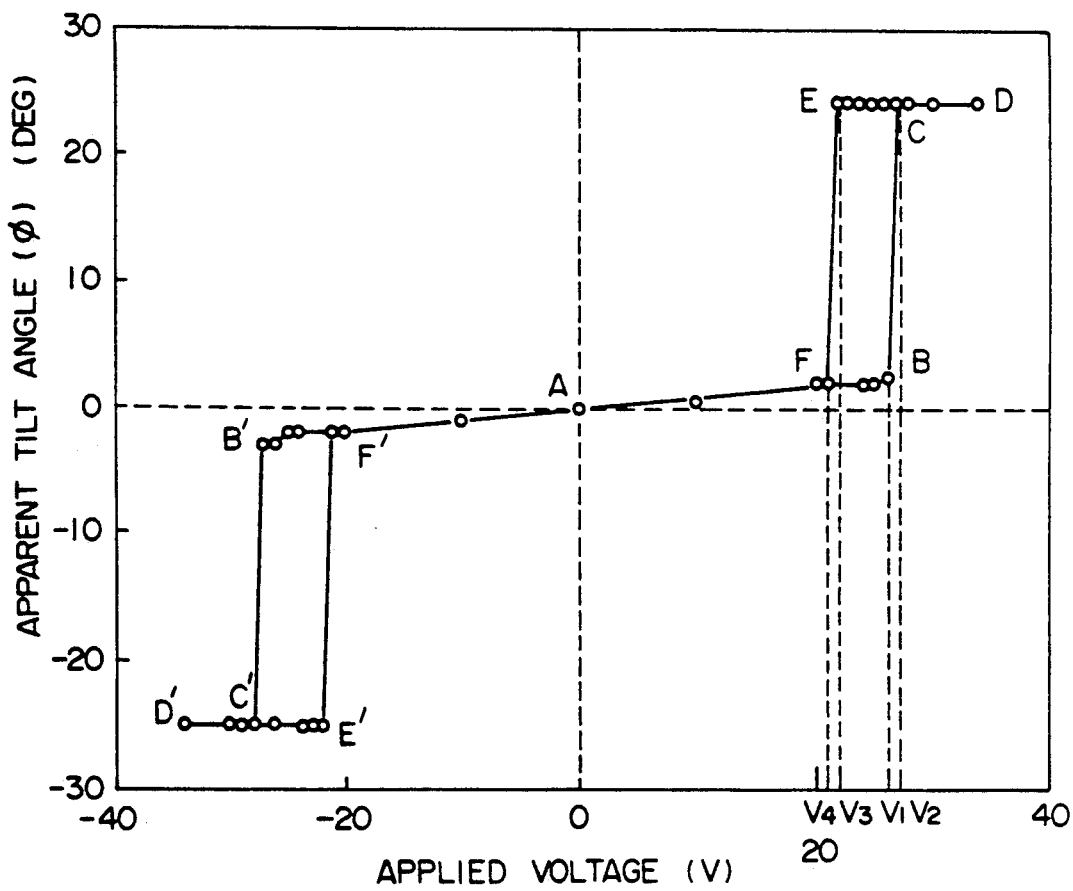
FIG. 3 shows the relation between the apparent tilt angle ($\phi$) and the applied dc voltage in the ferro-electric liquid cell of this invention.

(2) The apparent tilt angle (the angle formed between the direction normal to the layer and the average direction of molecular longitudinal axis) of the liquid crystal molecules in an antiferroelectric phase has hysteresis with respect to a dc voltage applied, as shown in FIG. 3. Furthermore, as shown in FIG. 3, this liquid crystal cell has a clear threshold value with respect to the dc voltage applied.

(3) When a voltage above the threshold value is applied to a liquid crystal cell parallel aligned and having an antiferroelectric phase, the liquid crystal molecules attain a uniform state as is the case of the chiral smectic C phase.

Figure 6:
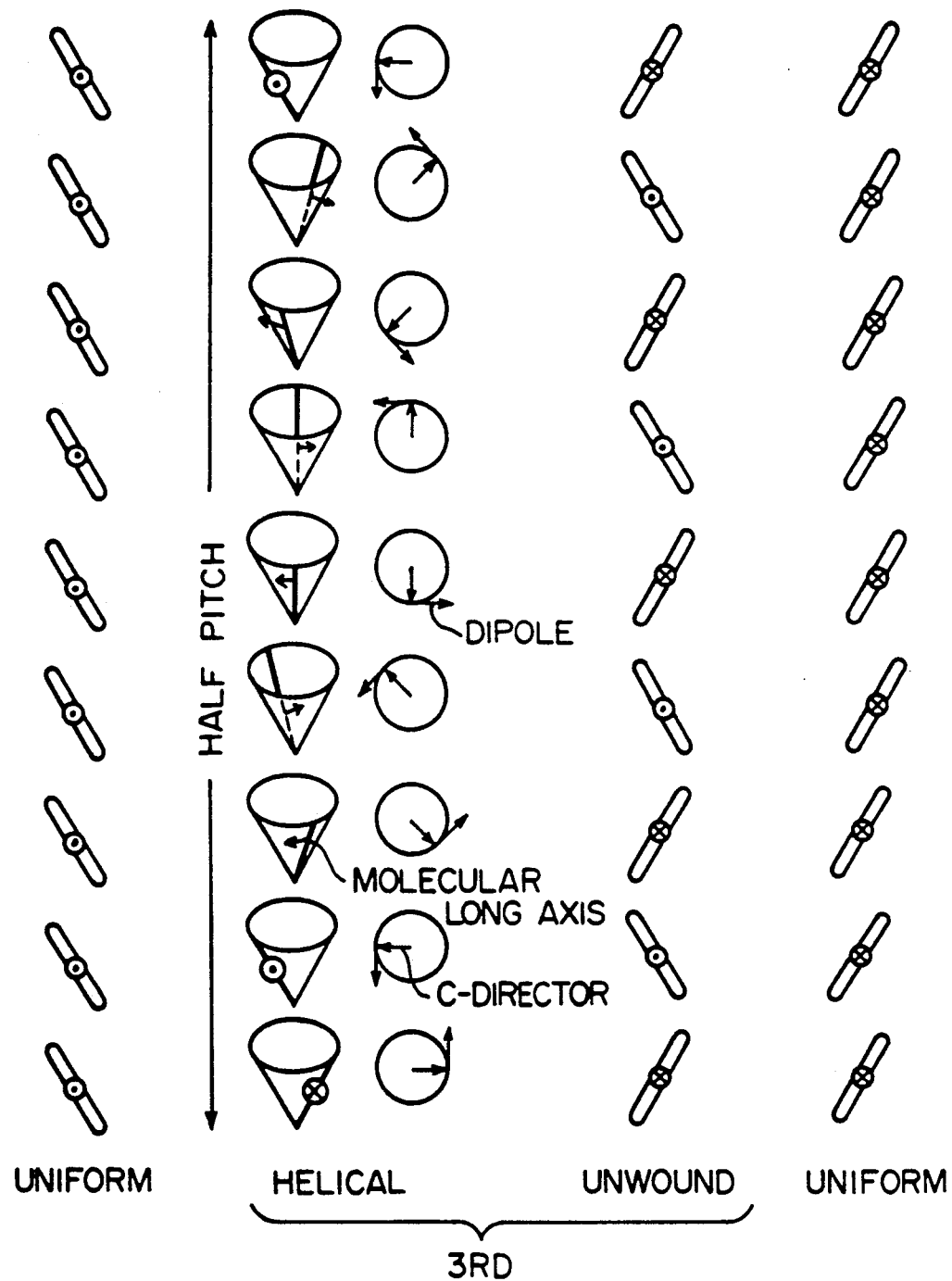
FIG. 6 is a schematic view of the molecular arrangement of the liquid crystal cell of the invention when it is viewed from above.

When the liquid crystal cell parallel-aligned and having an antiferroelectric phase is held between crossed polarizers and observed, the extinction position of the liquid crystal cell is in a direction normal to the layer and in a direction parallel to the layer in the absence of an electric field. From this fact, it can be said that in the absence of an electric field, the long axes of the liquid crystal molecules are aligned parallel to the direction normal to the layer. When a dc voltage above the threshold value is applied to the liquid crystal cell, the liquid crystal molecules are tilted at a certain angle from the normal to the layer, and attain a uniform state observed in an ordinary chiral smectic C phase. In other words, the antiferroelectric phase has the two uniform states known heretofore and one new state in which the liquid crystal molecules are apparently aligned in the direction normal to the layer. This new state is called a third state. One characteristic of the antiferro-electric phase is that it has the above three stable states (tristability). So far, much has been unknown on the detailed molecular arrangement in the antiferroelectric phase having tristability. A possible arrangement is shown in the model view in FIG. 6 (see Japanese Journal of Applied Physics, Vol. 28, p. 1265, 1989). FIG. 6 is taken by viewing the liquid crystal cell from above. The center of FIG. 6 shows the third state. The long axes of the liquid crystal molecules are oriented in opposite directions between adjacent liquid crystal layers, and consequently, their dipole moments cancel with each other between the adjacent layers. The right and left end of FIG. 6 show a uniform state.

Another characteristic feature of the liquid crystal cell having a antiferroelectric phase is that the apparent tilt angle of the liquid crystal molecules has two hysteresis with respect to a dc voltage applied, there exists a clear dc voltage threshold value, as shown in FIG. 3. Specifically, when a dc electric field is applied to the electrode of the liquid crystal cell in a certain direction and the voltage is increased, the tilt angle (point A in FIG. 3) which was initially 0 changes slightly until the voltage reaches near $V_1$ (point B in FIG. 3). As the voltage is further increased, the apparent tilt angle abruptly changes. When the voltage is increased to $V_2$, the abrupt change of the apparent tilt angle stops (point C in FIG. 3), and with a further increase in voltage, hardly any change in tilt angle occurs (point D of FIG. 3). When the voltage begins to decrease from this state, the tilt angle hardly changes in the initial stage. When the voltage decreases to $V_3$, the apparent tilt angle begins to change (point E in FIG. 3). When the voltage continues to be decreased, the apparent tilt angle abruptly changes, and at a voltage of $V_4$, the abrupt change of the apparent tilt angle ceases (point F in FIG. 3). As the voltage is further decreased, the apparent tilt angle gradually decreases, and reaches about 0 at a voltage of 0. Because of the difference between the threshold voltage $V_1$ from the uniform state to the third state and the threshold voltage $V_3$ from the third state to the uniform state, the apparent tilt angle shows hysteresis with respect to the dc voltage applied. Even when the direction of the electric field applied is reversed, the same phenomenon as above occurs, although the direction of the change of the apparent tilt angle is reversed to that described above. When in FIG. 3 an electric field in a reverse direction is applied and the voltage is increased and then decreased, the apparent tilt angle changes from point A→ point B'→ point C'→ point D'→ point E'→ point F'→ point A. Since the apparent tilt angle abruptly changes with the change of the voltage from $V_1$ to $V_2$, a liquid crystal cell having an antiferro-electric phase ($S_mC_A^*$) has a clear threshold value in dc voltage applied.

Figure 7A:
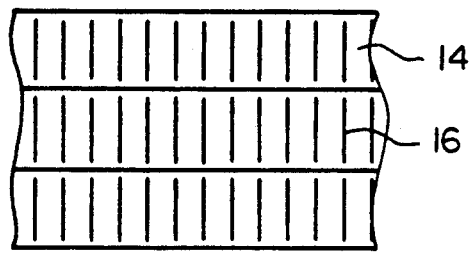
FIGS. 7A and 7B are schematic views of the molecular arrangements of various liquid crystal phases when the liquid cell, is viewed from above.
Figure 7B:
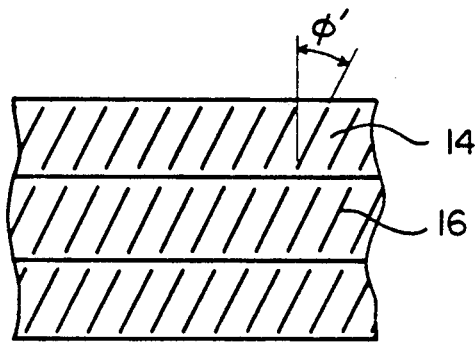

Many smectic phases such as a smectic A phase or a chiral smectic C phase have so far been known. They differ from the antiferroelectric phase in the following respects. FIGS. 7A and 7B show the relation between a liquid crystal layer 14 and liquid crystal molecules when the liquid crystal cell is viewed from above.

The smectic A phase, as shown in FIG. 7A, is a phase in which the liquid crystal molecules are aligned parallel to a direction normal to the layer. In the smectic A phase, the extinction position in the absence of an electric field applied is in a direction normal to the layer and a direction parallel to the layer as in the case of the antiferroelectric phase ($S_mC_A^*$) However, in the smectic A phase, the apparent tilt angle of the liquid crystal molecules has no hysteresis with respect to the dc voltage applied, and has no threshold value relating to a dc voltage applied.

Figure 7C:
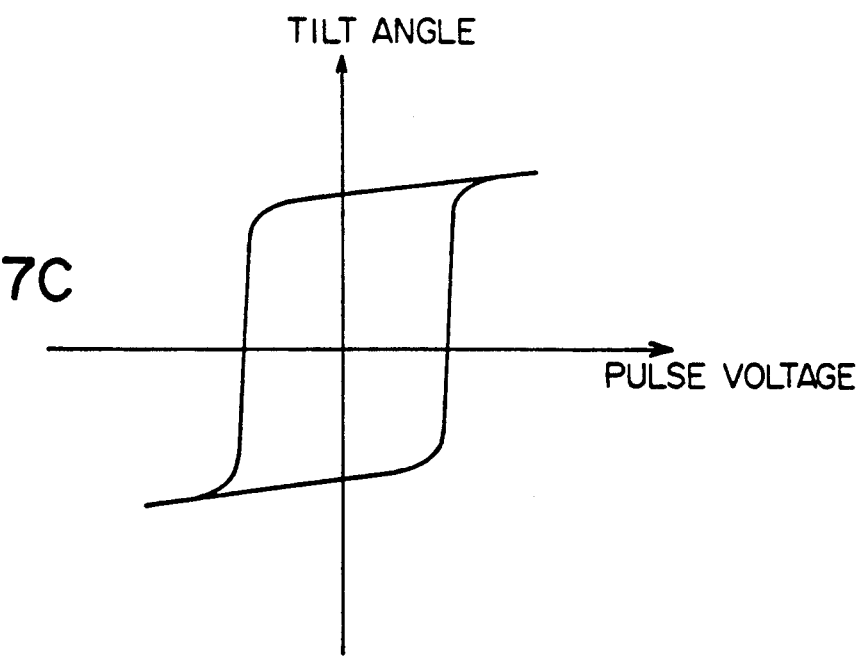
FIGS. 7C shows and the hysteresis the apparent tilt angle against the pulsed voltage applied to a ferro-electric liquid crystal cell having no antiferro-electric layer.

The chiral smectic C phase, as shown in FIG. 7B, is a phase in which the liquid crystal molecules are titled at an apparent tilt angle ($\phi'$) with respect to the normal to the layer. An SSFLC cell in the chiral smectic C phase has bistability, and when an electric field is applied, the liquid crystal molecules switch in a bistable state, namely between two uniform states. The relation between the pulsed voltage and the apparent tilt angle is such as that shown in FIG. 7C, the liquid crystal molecules have a threshold voltage with respect to the pulsed voltage and a hysteresis. The antiferroelectric phase clearly differs from the well known smectic phases such as the smectic A phase or the chiral smectic C phase.

Glass and plastics, for example, may be used as materials for the substrate used in this invention, and desirably transparent electrodes are disposed on the substrates. Desirably, an organic polymeric film subjected to a rubbing treatment is formed on one or both surfaces of the substrates as an aligned film. Examples of the organic polymeric film are polyimide films, polyamide films and polyvinyl alcohol films. Instead of the organic polymeric film, an inorganic film such as a film of yttrium or silicon oxide (SiO or $SiO_2$) may be used. The liquid crystal may also be aligned by using the temperature gradient method in preparing a cell by holding the liquid crystal between a pair of parallel substrates, and in this case, the parallel substrates do not have to be subjected to an aligning treatment.

Preferably, the transparent electrode used in this invention is an ITO film or a NESA film.

The distance between the parallel substrates in this invention, i.e. the cell gap, varies depending upon the use to which the liquid crystal cell is put, but is preferably 0.5 to 300 micrometers. It is especially preferably 1.5 to 10 micrometers, above all 1.5 to 5 micrometers, when the cell is used as a display device.

The following Examples illustrate the present invention more specifically.

EXAMPLE 1

4-(1-Methylheptyloxycarbonyl)phenyl 4'-octyloxybiphenyl-4-carboxylate was used as a liquid crystal. The phase transition temperatures were 149° C. for an isotropic phase to an $S_mA$ phase, 121° C. for $S_mA \rightarrow S_mC^*$, 116 C* for $S_mC^* \rightarrow S_mC_A^*$, and 65° C. for $S_mC_A^* \rightarrow$ crystal.

A pair of ITO-coated glass substrates were coated with a polyimide, and then only one of the substrates was subjected to a rubbing treatment. The liquid crystal was introduced between the pair of substrates to make a liquid crystal cell. The cell gap was 6 micrometers. The liquid crystal cell was heated until the liquid crystal became an isotropic phase. Then, the liquid crystal cell was gradually cooled at a rate of 1° C./min to align the liquid crystal molecules parallel to the glass substrates uniformly to obtain a sample for X-ray diffractometry. The temperature of the liquid crystal cell was controlled by using a temperature control unit having an accuracy of ±0.1° C.

X-ray diffractometry was carried out by using a device Ru-200 (made by Rigaku Co., Ltd.) in accordance with the diffractometric system shown in FIG. 1. The procedure of X-ray diffractometry was in accordance with Japanese Journal of Applied Physics, Vo. 27, PP L725, 1988 and Japanese Journal of Applied Physics, Vol. 27, PP L1993, 1988. Specifically, by using a capillary cell filled with the liquid crystal, the Bragg's angle of the liquid crystal was measured. Then, the counter was set at the Bragg's angle. The cell prepared by the above procedure was rotated by an angle $\alpha$, and an X-ray diffraction pattern was obtained. The $\alpha$ is an angle formed between the glass surface and an incident beam. The size of the X-ray beam was 1 $mm^2$. X-ray diffractometry was carried out with regard to the case where the temperature of the liquid crystal cell was adjusted to 100° C. ($S_mC_A^*$ phase) and after aligning the liquid crystal, an electric field was never applied, to the case where an electric field was applied and the applied dc voltage was gradually increased up to 70V, and to the case where the applied voltage was finally removed.

The X-ray diffractometric conditions were as follows:

X-diffraction device: Ru-200, 60 kV, 200 mA
Target: Cu
Filter: Ni
Voltage: 50KV
Current: 200 mA
Scan speed: 4 deg/min.
Sampling rate: 0.1 deg, continuous scan
Slid: DS 0.5°, RS 0.3 mm, SS 0.5°
Detector: P. C.

FIG. 4 shows the X-ray diffraction patterns. In FIG. 4, the axis of ordinates represents the X-ray diffraction intensity and the axis of abscissas represents the rotation angle $\alpha$ of the liquid crystal cell. It is seen from FIG. 4 that as the applied voltage is increased, the layer structure of the liquid crystal changed from the chevron structure to a bookshelf structure. The threshold voltage of switching of the liquid crystal molecules was 27V (FIG. 3, $V_1$). From this fact, it can be seen that to convert the layer to one of a bookshelf structure, a voltage more than twice the threshold voltage should be applied. It is also seen that when the applied voltage is removed, the layer structure of the liquid crystal returns to the chevron structure (see the X-ray diffraction pattern of 70→0V in FIG. 4).

EXAMPLE 2

A liquid crystal cell in which both of a pair of glass substrate were rubbed, and a liquid crystal cell in which one of a pair of glass substrates was rubbed were constructed by the same procedure as in Example 1, and by X-ray diffractometry, the layer structure of the liquid crystals were examined. The liquid crystal cell in which both glass substrates were rubbed was maintained a temperature of 90° C. ($S_mC_A^*$ phase), and X-ray diffractometry was carried out with regard to the case where after aligning the liquid crystal, an electric field was never applied, to the case where an electric field was applied and the applied dc voltage was gradually increased up to 80V, and to the case where the applied voltage was removed. The results are shown in FIGS. 2A, 2 and 2B. In these figures, the axis of ordinates represents the X-ray diffraction intensity, and the axis of absciss as represents the rotation angle $\alpha$ of the liquid crystal cell.

Figure 2D:
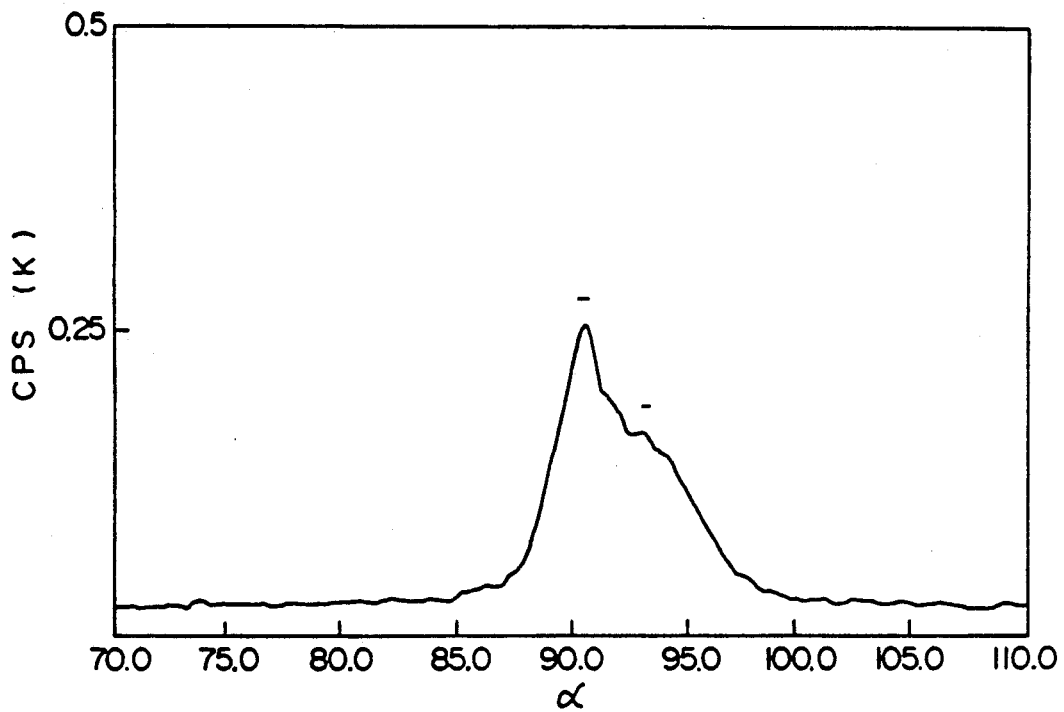

The liquid cell in which only one of the pair of glass substrates was rubbed was maintained at a temperature of 90° C. ($S_mC_A^*$ phase), and from the state where an electric field was never applied after aligning the liquid crystal, a dc voltage of 80V was applied and then the applied voltage was removed. The X-ray diffraction pattern obtained at this time is shown in FIG. 2D. It is seen from FIG. 2D and the X-ray diffraction pattern of 70→0V of FIG. 4 that the X-ray diffraction pattern of the liquid crystal cell having a chevron structure (only one substrate was rubbed), which was measured after removing the applied voltage, varied to some extent, depending upon the cells. FIGS. 2B and 2D show that the X-ray diffraction pattern of the liquid crystal cell having a chevron structure after removing of the applied electric field greatly differs depending upon the substrate rubbing conditions.

EXAMPLE 3

By using the liquid crystal cell obtained in Example 1 in which only one substrate was rubbed, the relation between the apparent tilt angle and the dc applied voltage was examined at 100° C. The apparent tilt angle was taken as the angle formed between the normal to the layer and the extinction position. The measuring method was as follows: A dc voltage was applied stepwise to the liquid crystal cell, and the extinction position at each voltage was observed by a polarizing microscope with a crossed polarizer, and the apparent tilt angle was determined. The results are shown in FIG. 3. FIG. 3 shows that this liquid crystal cell has a threshold value with respect to a dc voltage and memory characteristics The threshold value with respect to the dc voltage was 27V ($V_1$ in FIG. 3).

EXAMPLE 4

The liquid crystal cell of Example 1 in which only one substrate was rubbed was used, and the texture of the liquid crystal was observed by using a polarizing microscope with a crossed polarizer. During the microscopic observation, the liquid crystal cell was maintained at a temperature of 100° C. Immediately after the liquid crystal molecules were aligned, many zig-zag defects were observed in the liquid crystal cell. But when a voltage of 70V was applied to the cell, the zig-zag defects disappeared. When the application of the voltage was cut off, no zig-zag defects appeared again. In the cell in which zig-zag defects occurred immediately after aligning of the liquid crystal, a voltage of ±35V having a rectangular wave form was applied, and the contrast between two uniform states was measured. The contrast ratio was 35. A voltage of 70V was applied to this cell to remove the zig-zag defects Then, a voltage of ±35V having a rectangular wave form was again applied to it, and the contrast between the uniform states was measured. The contrast ratio increased to 60, showing a very high contrast.

EXAMPLE 5

4-(1-methylheptyloxycarbonyl)phenyl 4'-octyloxybiphenyl-4-carboxylate was used as a liquid crystal. The phase transition temperatures were 149° C. for isotropic phase→$S_mA$ phase, 121° C. for $S_mA$→$S_mC^*$, 116° C. for $S_mC^*$→$S_mC_A^*$, and 65° C. for $S_mC_A^*$→crystal. The liquid crystal was introduced between a pair of ITO-coated glass substrates, and the liquid crystal was aligned uniformly in parallel to the substrates by the temperature gradient method. The cell gap was 2.5 micrometers. In this liquid crystal cell, the threshold value to a dc voltage was 15V. The cell was maintained at 70° C., and a voltage of ±17V having a rectangular waveform and a frequency of 5Hz was applied, and the response time was measured. When the above voltage was applied to the cell to which an electric field was never applied after aligning the liquid crystal, the response time was 34 microseconds. On the other hand, when a dc voltage of 80V was once applied to this cell to change the layer structure to a bookshelf structure and again the above voltage was applied, the response time was 27 microseconds. By once changing the chevron structure to the bookshelf structure by application of an electric field, the response speed was increased.

We claim:

1. A ferroelectric liquid crystal cell comprising a ferroelectric liquid crystal having an antiferro-electric phase ($S_mC_A^*$) or its composition and a pair of substrates having electrodes and holding said liquid crystal or its composition therebetween, characterized in that the layer structure of said liquid crystal in the antiferro-electric phase ($S_mC_A^*$) has once been changed from a chevron structure to a bookshelf structure by application of a voltage to the electrodes.

* * * * *